US006702969B2

(12) United States Patent
Matuana et al.

(10) Patent No.: US 6,702,969 B2

(45) Date of Patent: Mar. 9, 2004

(54) METHOD OF MAKING WOOD-BASED COMPOSITE BOARD

(75) Inventors: Laurent Malanda Matuana, Houghton, MI (US); Julia A. King, Laurium, MI (US)

(73) Assignee: Board of Control of Michigan Technological University, Houghton, MI (US)

(*) Notice: Subject to any disclaimer, the term of this patent is extended or adjusted under 35 U.S.C. 154(b) by 0 days.

(21) Appl. No.: 10/352,481

(22) Filed: Jan. 28, 2003

(65) Prior Publication Data

US 2003/0171457 A1 Sep. 11, 2003

Related U.S. Application Data

(62) Division of application No. 09/905,169, filed on Jul. 13, 2001, now abandoned.

(60) Provisional application No. 60/218,250, filed on Jul. 14, 2000.

(51) Int. Cl.[7] .......................... B29B 11/06; B29B 11/14

(52) U.S. Cl. ....................... 264/122; 264/109; 264/123; 264/126

(58) Field of Search ................................ 264/109–128

(56) References Cited

U.S. PATENT DOCUMENTS

| | | | | | |
|---|---|---|---|---|---|
| 4,070,019 | A | | 1/1978 | Segal et al. | |
| 4,533,589 | A | | 8/1985 | Sewell | |
| 4,592,962 | A | | 6/1986 | Aoki et al. | |
| 4,615,936 | A | | 10/1986 | Baum | |
| 4,940,741 | A | | 7/1990 | De Wacker et al. | |
| 5,002,713 | A | | 3/1991 | Palardy et al. | |
| 5,028,286 | A | | 7/1991 | Hsu | |
| 5,059,264 | A | | 10/1991 | Sheets | |
| 5,367,040 | A | | 11/1994 | Teodorczyk | |
| 5,432,000 | A | | 7/1995 | Young, Sr. et al. | |
| 5,611,827 | A | * | 3/1997 | Hammarstrom et al. | 51/298 |
| 5,620,642 | A | | 4/1997 | Kamite et al. | |
| 5,629,083 | A | | 5/1997 | Teodorczyk | |
| 5,635,123 | A | | 6/1997 | Riebel et al. | |
| 5,736,218 | A | | 4/1998 | Iwata et al. | |
| 5,976,204 | A | * | 11/1999 | Hammarstrom et al. | 51/298 |
| 6,010,793 | A | | 1/2000 | Yoshimura et al. | |
| 6,124,028 | A | | 9/2000 | Nagle et al. | |
| 6,217,413 | B1 | | 4/2001 | Christianson | |
| 6,348,119 | B1 | | 2/2002 | Leonte et al. | |

OTHER PUBLICATIONS

L. Constantino, B. Gellner, M. Percy; Market Share Competition Between Plywood and Non–Veneered Structual Wood Panels in Canada and The United States, Working Paper 129, Mar. 1989; Forest Economics and Policy Analysis Research Unit, Vancouver, B.C. Canada V6T 1Z8.

John A. Youngquist, Andrzej Krzysik, Roger M. Rowell; Dimensional Stability of Acetylated Aspen Flakeboard; Wood and Fiber Science 18(1), Jan. 1986; pp. 90–98.

Byung–Dae Park, Bernard Riedl, Ernest W. Hsu, Jack Shields; Differential Scanning Calorimetry of Phenol–Formaldehyde Resins Cure–Accelerated by Carbonates; Polymer 40; 1689–1699; 1999.

Robert L. Geimer, Jin Heon Kwon, James Bolton; Flakeboard Thickness Swelling, Part I. Stress Relaxation in a Flakeboard Mat; Wood and Fiber Science 30(4); Oct. 1998, pp. 326–338.

(List continued on next page.)

*Primary Examiner*—Stephen J. Lechert, Jr.

(74) *Attorney, Agent, or Firm*—Michael Best & Friedrich LLP

(57) ABSTRACT

A wood composite board or panel, such as particleboard, fiberboard, oriented strand board or waferboard and a method of producing the same. The composite board or panel comprises a plurality of wood pieces, thermoset resin to bind the wood pieces and a filler having a high thermal conductivity. Examples of such a filler include natural and synthetic graphites, metal, carbon, silicon carbide and other similar compounds and their mixtures.

20 Claims, 3 Drawing Sheets

OTHER PUBLICATIONS

Robert L. Geimer, Jin Heon Kwon; Flakeboard Thickness Swelling. Part II. Fundamental Response of Board Properties to Steam Injection Pressing; Wood and Fiber Science 31(1); Jan. 1999; pp. 15–27.

A. Pizzi; Phenolic Resin Wood Adhesives, In Pizzi, A., (ed.) Wood Adhesives, Chemistry and Technology, Marcel Dekker, New York, pp. 105–176 (1983).

Lawrence Gollob; The Correlation Between Preparation and Properties in Phenolic Resins, In: Pizzi, A. (ed.) Wood Adhesives, Chemistry and Technology, vol. 2, Marcel Dekker, New York, pp. 121–153 (1989).

David A. Pease, Ted Blackman, Thea Hillman, Sharman George; Panels; Products, Applications and Production Trends 2nd Edition; Miller Freeman; 1996; pp. 134–137.

Maloney, T.M.; Modern particleboard and dry–process fiberboard manufacturing. Updated edition. Miller Freeman Publications, Inc., San Francisco, Calif. (1993).

Heebink, B.G. and F.V. Hefty, Steam Post–treatments to Reduce Thickness Swelling of Particleboard, U.S. For. Ser. Res. Note FPL–0187, Madison, WI (1968).

Sellers, T. Jr., Plywood and Adhesive Technology, Marcel Dekker Inc., New York, NY (1985).

Holmes, C.A., Effect of Fire–Retardant Treatments on Performance Properties of Wood, Wood Technology: Chemical Aspects. ACS Symposium Series 43: 83–106 (1977).

Crow's, Oriented Strand Board, Forest Industry Journal, C.C. Crow Publications Inc., vol. 12, No. 4 (Oct. 1997).

* cited by examiner

METHOD OF MAKING WOOD-BASED COMPOSITE BOARD

CROSS-REFERENCE TO RELATED APPLICATIONS

This application is a divisional of U.S. application Ser. No. 09/905,169 filed on Jul. 13, 2001 now abandoned and claims priority under 35 U.S.C. § 119 to provisional patent application No. 60/218,250 filed Jul. 14, 2000. This application claims priority to each of these applications.

FIELD OF THE INVENTION

The present invention relates generally to wood-based composite boards or panels such as particle board, oriented strand board, waferboard, fiberboard and the like. More particularly, the present invention relates to a method and the composite board product made from using materials having high thermal conductivity, such as carbons, metals, carbides and nitrides, as fillers in the manufacturing of such particle boards.

BACKGROUND OF THE INVENTION

Wood-based composite board is typically a panel manufactured from wood materials, primarily in the form of particles (particleboard), flakes (oriented strand board (OSB) or waferboard (random-orientation of flakes)), and fibers (medium density fiberboard, MDF), combined with a thermoset resin and bonded at an elevated temperature and an elevated pressure typically in a hot press. As a result, the process is sometimes referred to as hot pressing. In such a manufacturing process, the productivity or throughput of a plant or a production line depends heavily on the major production steps including wood drying, resin application, and hot pressing. Hot pressing is considered a costly unit operation. A reduced pressing time, therefore, will have positive impacts on lowering the production costs and increasing wood board output capacity. Hence, the wood-based composite industry is constantly looking for strategies to reduce the pressing time.

The pressing time, which is defined as the time it takes to compress a mat made of wood pieces and resins to the final board thickness once the press platens make contact with the mat surfaces, must be sufficiently long to allow proper curing of the thermoset resin present in the mat. The heat transfer from the mat faces to the core is a critical factor in determining the curing rate of the resin, thus the final press time. Because of the low heat conductivity of wood and wood pieces, the cure of the resin takes place first in the faces when the hot platens are in contact with the mat during pressing while the core of the board is still cold. Consequently, a fairly long time will be needed for sufficient heat to reach the core of the board, which will allow the middle (core) of the board to cure.

In conventional approaches to solving the problem, high press temperatures and/or an external catalyst is often used to accelerate the resin cure rate to obtain acceptable press times. Usually a dilute acid or an acidic salt (ammonium sulfate and chloride) in a 20 to 30% aqueous solution is used as external catalyst. Sodium hydroxide, carbonates, and other similar basic compounds also may be used to promote fast cure of the resins by accelerating the polymerization of certain thermoset resins. The external catalyst, however, is generally acceptable only if it will produce shorter press times at a low concentration in the range of 0.25 to 1% by weight of the resin.

Higher pressing temperatures generally are not preferred partly due to higher energy consumption. More importantly, higher press temperatures tend to generate more volatile organic compounds (VOCs) that may adversely affect the environment. Additional equipment or steps may be needed to prevent escape of volatile organic compounds to the atmosphere. Although press times may be shortened through these approaches, there is still a need to develop more cost-effective and environmentally friendly approaches to reduce the press times.

Water absorption and dimensional stability of the wood composition board are additional important property issues faced by the industry. Because wood absorbs water, the thickness of the panel swells and the panels decay when they come in contact with water or moisture. Since most of the thickness swelling is not reversible when the panels are re-dried, the products are regarded as undesirable or unacceptable for many applications (such as siding) where high moisture situations are expected. It is therefore desirable to reduce water absorption and increase dimensional stability.

The thickness swelling of wood-based composite panels depends on both the nature of their constituents and the manufacturing process. As already discussed, the panels are made up of small pieces of wood bonded together with adhesives or thermoset resins at elevated temperature and elevated pressure to develop adequate mechanical strength properties. During this process, the wood is typically densified by a factor up to 1.3 times higher than its original density. Internal stresses are induced and built-up within and between flakes/particles during densification. When the panel absorbs water, these internal stresses are relieved and the compressed wood springs back to regain its natural form and density. As a result, the panel swells in the thickness direction.

Extensive research has been conducted to reduce water absorption and thickness swelling of wood-based composite panels. It has been shown by a number of investigators that minimizing the compressive stress during and/or after panel consolidation can significantly reduce the spring back phenomenon, and a dimensionally more stable panel can be produced. Many methods have been suggested to control thickness swelling of wood-based composite panels. These include the use of high adhesive (typically thermoset resins, also called binder) content, longer press time and/or much higher press temperature during panel manufacturing. The use of a steam-injected press and the post-press treatment of the board with steam in a pressure vessel also have been suggested. Addition of emulsion wax (0.25–1% wt of oven dried wood) to the wood furnish during resin application has been reported to lower the water absorption of the panel. The cost-effectiveness of all these approaches remains unclear.

SUMMARY OF THE INVENTION

The present invention relates to a wood composite for making board or panel and the like comprising a plurality of wood pieces; a thermoset resin capable of binding the wood pieces; and a filler having a high thermal conductivity. The wood pieces are in a form selected from particles, flakes, fibers or mixtures thereof. The wood pieces or the product board (or panel) also may be acetylated. The filler may be selected from a group consisting of metals such as aluminum, iron, tungsten, zinc, copper, tin, titanium and mixtures thereof; carbon filler such as natural graphite, synthetic graphite, scrap graphite, carbon black, carbon fiber, metal (such as nickel) coated carbon fiber, carbon nanotubes, coke and mixtures thereof; a nitride such as silicon nitride, carbon nitride, boron nitride; a carbide such as silicon carbide; conducting polymers; and mixtures thereof. The thermoset resin is selected from the group consisting of phenolic resin, MDI resin, urea resin, melamine resin, epoxy resin, urethane resin, particularly non-foaming urethane resins and mixtures thereof. A catalyst may also be added to the composition to accelerate curing of the thermoset resin and/or reducing the hot-pressing time.

The present invention also relates to a method for manufacturing wood composite board (including panels), the method comprises mixing a thermoset resin and a plurality of wood pieces to form a blend; adding a filler having a high thermal conductivity to the blend to form a mixture; placing the mixture in a shaped container; and applying an elevated temperature and an elevated pressure to the mixture in the shaped container to form the wood composite board.

DETAILED DESCRIPTION OF THE INVENTION

Figure 1:
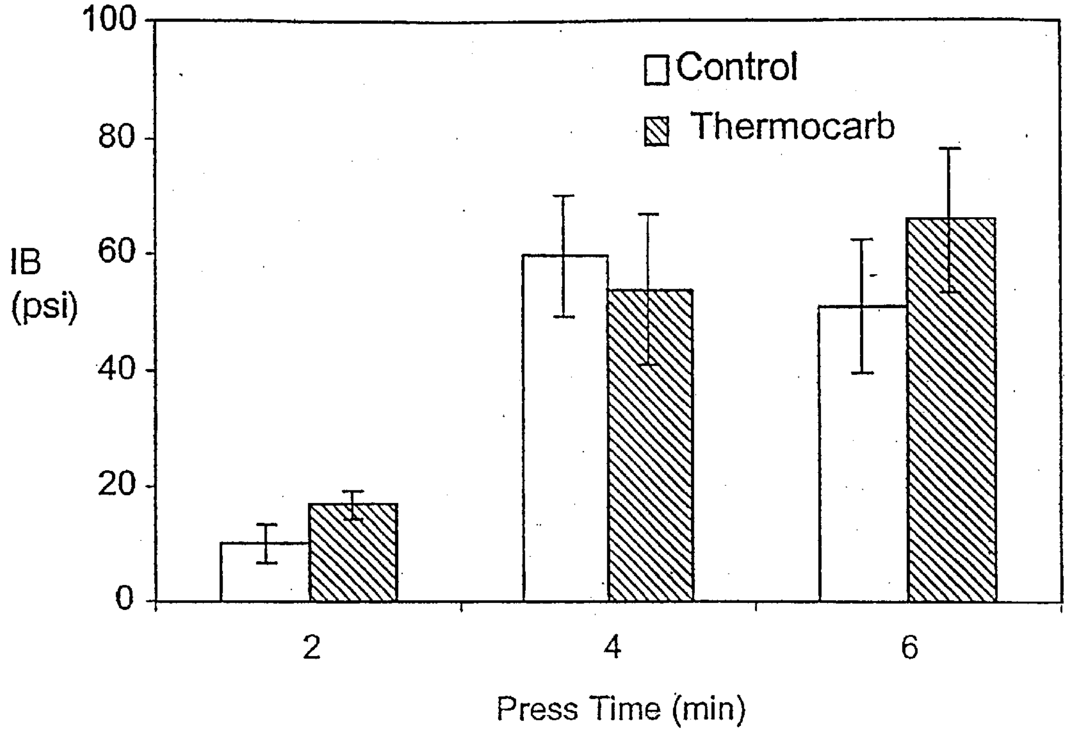
FIG. 1 is a graphic illustration of the present invention and its effect on pressing time and bond strength.

The present invention provides a new and improved wood-based composite board or panels and a method of producing such. The present invention combines a high thermal conductivity filler such as carbon fillers with wood flakes, particles, or fibers as a means to promote resin cure and reduce water absorption and thickness swelling of the composite wood board or panel. The addition of a filler with relatively high thermal conductivity reduces press times, water absorption, and/or thickness swelling.

Before explaining at least one embodiment of the invention in detail, it is to be understood that the invention is not limited in this application to the details of construction and to the arrangement of the components set forth in the following description. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention.

It is one object of the present invention to provide a new and improved wood-based composite board or panel product and manufacturing method thereof which reduces the press time needed by increasing the thermal conductivity of wood composite.

A further object of the present invention is to provide a new and improved wood-based composite board or panel product and method thereof which reduces the water absorption of the board or panel.

Still another object of the present invention is to provide a new and improved wood-based composite board or panel product and method thereof which reduces the thickness swelling.

Wood pieces may come from various trees such as coniferous trees, broadleaf trees, softwood, hardwood, aspen, fast-growing trees, poplar, birch, waste wood products, extracted or treated (for example with a solvent) wood pieces and mixtures thereof. They can be in a form selected from particles, flakes, fibers and mixtures thereof. The wood pieces or strands or board/panel may be further acetylated with known chemistry/methods to further increase water/moisture resistance and/or improve dimensional stability of the final product.

Thermoset resin, also may be referred to as adhesive or binder, includes, but is not limited to phenolic resin, urea resin, melamine resin, epoxy resin, urethane resin and mixtures thereof. A common and preferred phenolic resin is phenol-formaldehyde (PF) resin. Both slow curing and fast curing PF resins may be used. Urethane resins, such as MDI (methylene diphenyl diisocyanate) or TDI (toluene diisocyanate) based resins, may be foaming, non-foaming or mixtures thereof. Non-foaming urethane resins are preferred urethane resins. Foaming urethane resins may be used to impart desired properties either alone or with other thermoset resins disclosed here. A foaming agent may be needed.

Many different materials are suitable for use in the composition of the present invention as the "filler." In order to improve heat transfer, a suitable filler should have a thermal conductivity that is higher than the thermal conductivity of the wood pieces or the thermoset resin. Such filler having high thermal conductivity includes, but is not limited to, a material selected from the group consisting of carbon filler, carbides, nitrides, metals, conducting polymers and mixtures thereof. A carbon filler may be selected from carbon fiber, metal (such as nickel) coated carbon fiber, carbon nanotubes, natural graphite, synthetic graphite (including high purity synthetic graphite), scrap graphite, various forms of coke, carbon black, and mixtures thereof. Carbides may be selected from the group consisting of silicon carbide, tungsten carbide, and mixtures thereof. Non-limiting examples of nitrides include boron nitride, various forms of silicon nitride and mixtures thereof. Suitable metals include, but are not limited to, aluminum, zinc, tungsten, iron, copper, titanium, tin, metal alloys and mixtures thereof. Many different types of known conducting polymers also may be used as the filler for the present invention. Non-limiting examples include doped or non-doped polyaniline, polypyrrole, and mixtures thereof.

The wood composite may further comprise a "catalyst." A catalyst here means a small amount of a material which can be used to increase curing of the thermoset resin, increase forming of the board or panel under the conditions, or both. Accordingly, any catalyst that is known to accelerate curing of any type of the thermoset resins disclosed herein is included, such as acid, base, etc. It should be understood that not every catalyst will work for all of the disclosed thermoset resins.

The wood composite has a general composition, by weight percent, as follows:

wood pieces, 40 to 99.5; thermoset resins, 0.5 to 50; filler, 0.05 to 50; and catalyst, 0 to 5.

In one embodiment, the filler may be about 5% by weight of the resin.

These, together with other objects of the invention, along with the various features of novelty which characterize the invention, are pointed out with particularity in the claims annexed to and forming a part of the disclosure. For a better understanding of the invention, its operating advantages and the specific objects attained by its uses, reference should be made to the accompanying descriptive matter in which there is illustrated preferred embodiments of the invention.

In a accordance with an exemplary embodiment of the invention, a wood composite board or panels such as but not limited to particle board, oriented strand board, waferboard, fiberboard, and the like is formed with the addition of a carbon filler. A preferred embodiment is carbon filler, such as but not limited to carbon fillers available from Conoco, Inc. with the trademark THERMOCARB®. THERMOCARB® is a high purity synthetic graphite, which has the general properties as listed in Table 1 below:

TABLE 1

| | |
|---|---|
| Ash | <0.1 wt. % |
| Sulfur | 0.02 wt. % |
| Vibrated Bulk Density | 0.66 g/cc |
| Density | 2.24 g/cc |
| Particle Sizing, vol % (by Sieve Method) | |
| +48 Tyler Mesh* | 4 |
| −48/+80 Tyler Mesh | 22 |
| −80/+200 Tyler Mesh | 48 |
| −200/+325 Tyler Mesh | 16 |
| −325 Tyler Mesh | 10 |
| Thermal Conductivity at 23° C. | 600. W/mK on a ¼" particle |
| Electrical Resistivity | $10^{-4}$ ohm-cm (approximate) |
| Particle Aspect Ratio | 2.0 |
| Particle Shape | Irregular |

*48 Tyler Mesh = 297 Microns
80 Tyler Mesh = 177 Microns
200 Tyler Mesh = 74 Microns
325 Tyler Mesh = 44 Microns It will be understood that various types of graphite or various types of carbon may be utilized within the scope of the invention.

Typical thermal conductivity values for some common materials are 0.2 for wood, 0.2 for thermosetting resins, 1 for carbon black, 10 for carbonized polyacrylonitrile (PAN) based carbon fibers, 234 for aluminum, 400 for copper, and 600 for graphite (all values in W/mK). A preferred embodiment to improving thermal conductivity of a wood composite is through the addition of a thermally conductive filler material, such as carbon. Thus, carbon fillers will act as heat transfer medium by transferring heat from the faces to the core of the panel quicker and more efficiently. This faster heat transfer will shorten the press time during particle board, oriented strand board, waferboard, fiberboard, and the like during manufacturing. Carbon is also less hygroscopic than wood; therefore, improving the dimensional stability, reducing water absorption, reducing linear expansion, and reducing thickness swelling of wood-based composites.

EXAMPLE 1

According to a preferred embodiment of the inventive process, particle board is bonded and produced by incorporating THERMOCARB® in fast curing phenol formaldehyde (PF) core resin.

Particle board panel manufacture generally involved three different steps: 1) resin application, 2) mat formation, and 3) hot pressing. In the first step, the dried furnish (5 wt % moisture content furnish) was placed in a rotating-drum blender and sprayed with 5 percent liquid PF (based on oven dry weight of the furnish) core resin on the dried wood particle. The liquid PF resin used was Georgia Pacific GPTM 167C09 ResiStran™ core resin. Table 2 lists the properties of this resin.

TABLE 2

| | |
|---|---|
| pH | approx. 11.5 |
| Specific Gravity @ 25° C., g/cc | 1.23 |
| Wt. % Volatile Matter | 50 |

The wood particles used were ¼" in size. They were produced from aspen flakes via grinding in a hammer mill. An atomization air pressure of 70 psig was used for the spray nozzles applying the liquid PF. The resin spraying time was 3 minutes but the retention-time of furnish in the blender was extended to an additional 2 minutes to achieve a better resin surface coverage.

It should be mentioned that emulsion wax was not used. Emulsion wax is typically used to reduce water absorption of the wood composite.

After this blending operation, wood particles were placed in a high-intensity mixer. Synthetic graphite was added and mixed with PF coated wood furnish for 5 minutes. The concentration of synthetic graphite was fixed at 30% based on PF weight (approximately 1.7% of the oven dry weight of wood particle).

In the second step, a single layer configuration mat was formed manually. The blended materials were placed in a 12" by 12" forming mat box. In the third step, the formed mat was hot pressed in a laboratory press using the following press cycle.

| | |
|---|---|
| Press closing time: | 10 seconds to press stops |
| Pressing times at stops: | 120, 240, and 360 seconds |
| Decompression time: | 20 seconds |
| Total pressing time: | 150, 270, and 390 seconds |
| Press temperature: | 375° F. (191° C.) |

Hence, three different pressing times (2, 4, and 6 min) were used.

The panel details are shown below:

| | |
|---|---|
| Panel dimensions: | 12 inches by 12 inches (laboratory press) |
| Panel thickness: | 7/16 in (11 mm) |

Core resin type and content: Liquid Core PF (Georgia Pacific), 5% (based on oven dry weight wood)

After the pressing operation, the load was removed from the panel and the panel sat on the press for 20 additional seconds (panels were decompressed) before removal from the press. The panel cooled to room temperature after removal from the press. Then the panel was trimmed by removing 1 inch on each side of the panel. Then test samples for internal bond and thickness swelling evaluations were cut from the remaining panel. These test specimens were conditioned to a constant weight in a walk-in temperature/humidity-controlled room, set at 12 wt % equilibrium moisture content. The internal bond strength (IB) and thickness swelling after 24 hours immersion in cold water were determined in accordance to the procedure outlined in ASTM D1037, Standard Test Methods for Evaluating Properties of Wood-based Fiber and Particle Panel Materials. In addition, the density of the particleboard was determined according to ASTM D1037. Table 3 contains the results obtained from Example 1.

TABLE 3

| | Internal Bond Strength (psi) | | |
|---|---|---|---|
| Composites | 2 min | 4 min | 6 min |
| Pure PF resin Only | 9.9 ± 3.4 (n = 10) | 59.4 ± 10.5 (n = 10) | 50.9 ± 11.3 (n = 10) |
| PF + THERMOCARB ® | 16.7 ± 2.5 (n = 10) | 53.9 ± 12.8 (n = 10) | 65.7 ± 12.6 (n = 10) |

The results, illustrated in FIG. 1, show that 2 minutes press time is too short for both the control and the THERMOCARB® synthetic graphite containing the particleboard. Not enough time transpired for the resin to cure. FIG. 1 also shows that, at 4 and 6 minute press times, the internal bond (IB) strength of both the control particle board and the THERMOCARB® containing the particle board are similar. As seen by the brackets, 95% confidence intervals overlap. Thus, synthetic graphite does not inhibit the curing of the PF resin.

Table 4 summarizes the results for thickness swelling of the particleboard bonded with PF and bonded with PF/THERMOCARB® resins. The thickness swelling is illustrated as a percentage. These results are also illustrated in FIG. 2.

TABLE 4

| | Thickness Swelling % | | |
|---|---|---|---|
| Composites | 2 min | 4 min | 6 min |
| PF Resin Only | 40.5 ± 3.1 (n = 5) | 25.6 ± 3.3 (n = 5) | 24.2 ± 2.1 (n = 5) |
| PF + THERMOCARB ® | 29.2 ± 6.4 (n = 5) | 19.8 ± 1.6 (n = 5) | 22.7 ± 2.4 (n = 5) |

Figure 2:
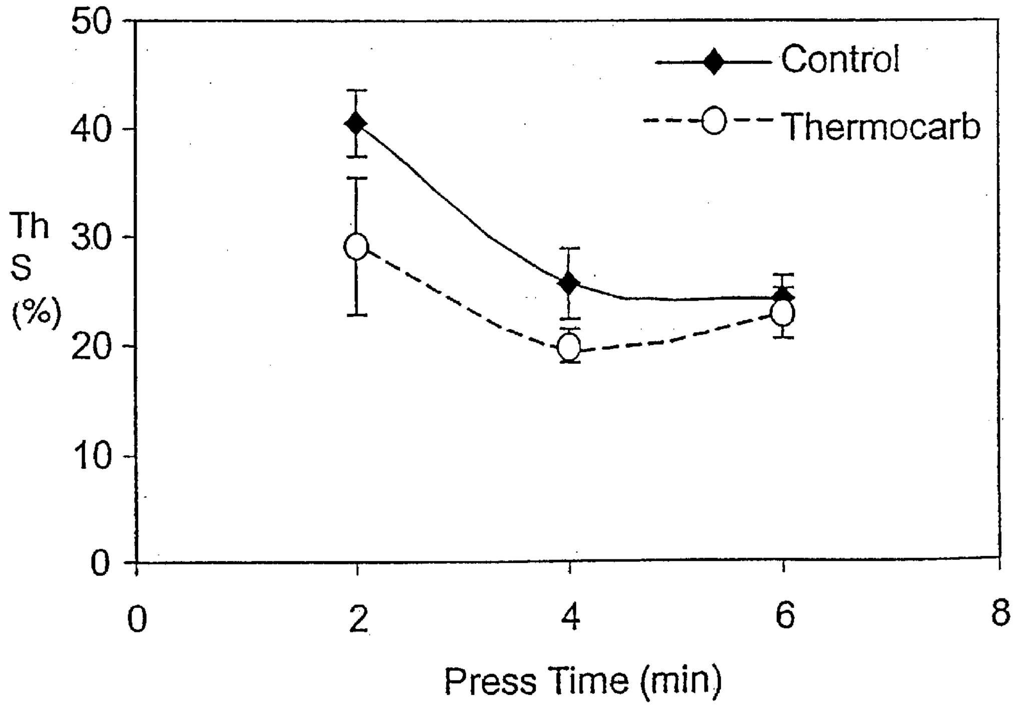
FIG. 2 is a graphic illustration of a preferred embodiment of the invention and its effect of pressing time on thickness swelling after 24 hours in cold water.

FIG. 2 shows that for the 2 and 4-minute press times, the thickness swelling was lower for the particleboard containing the synthetic graphite as compared to the control. For the 6 minute press time, there is no significant difference. This result is significant since thickness swelling is a major problem in OSB in particular. With core resin, the synthetic graphite improves the thickness swelling of the board.

Figure 3:
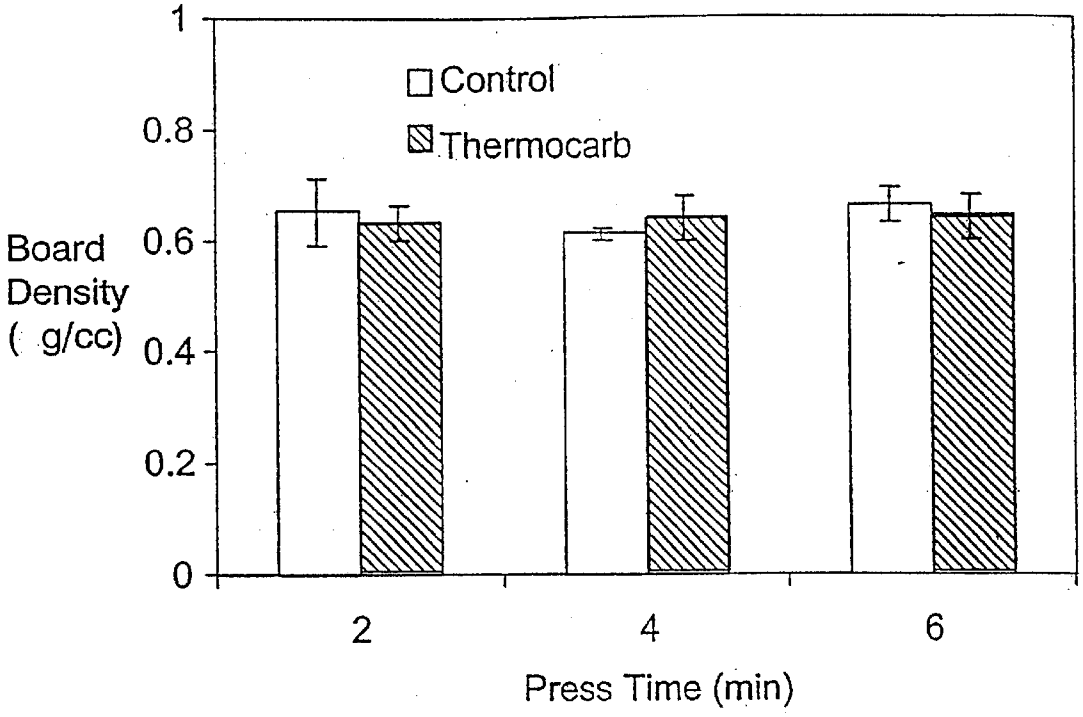
FIG. 3 is a graphic illustration of the invention and effect of pressing time on the density of particleboard.

The density of each sample is shown in Table 5. The results were obtained by following ASTM D1037. FIG. 3 illustrates these density results.

TABLE 5

| | Panel Density (g/cc) | | |
|---|---|---|---|
| Composites | 2 min | 4 min | 6 min |
| PF Resin Only | 0.65 ± 0.06 (n = 10) | 0.61 ± 0.01 (n = 10) | 0.66 ± 0.03 (n = 10) |
| PF + THERMOCARB ® | 0.63 ± 0.03 (n = 10) | 0.64 ± 0.04 (n = 10) | 0.64 ± 0.04 (n = 10) |

FIG. 3 shows that the density is similar for the control particleboard and the THERMOCARB® containing particleboard for all 3 pressing times.

According to the invention, IB is similar for the 4 and 6 minutes press times. Thus, with core resin, THERMOCARB® does not inhibit the curing of the PF resin. Also, when synthetic graphite is used, thickness swelling is reduced for the 2 and 4 minutes press times as compared to the control (no THERMOCARB®). Furthermore board densities are similar for all three press times for the control and the THERMOCARB® synthetic graphite containing particleboard. Thus, the synthetic graphite does not affect the board density.

EXAMPLE 2

According to a preferred embodiment of the invention, Example 2 generally shows the cure rate and dimensional stability of particleboard bonded with PF/synthetic graphite resin with the use of a slower curing PF face resin.

Particleboard was produced using a PF face resin (slower curing) instead of the faster curing PF core resin used in Example 1. Press times between 2 and 4 minutes were used to try to identify the minimum time needed to cure the resin. The board was manufactured as described in Example 1. 30 wt % THERMOCARB® was used based on weight of liquid PF resin. The board property characterization included IB, thickness swelling, board density, maximum water absorption, linear expansion, flexural strength and modulus (ASTM D1037). Table 6, below, shows the internal bond properties of particleboard panels made with face resin.

TABLE 6

| | Internal Bond IB (psi) | | | | | |
|---|---|---|---|---|---|---|
| | PF Control Press time (min) | | | PF + Synthetic Graphite Press time (min) | | |
| Samples | 2 | 3 | 4 | 2 | 3 | 4 |
| 1 | | 5.2 | 29.9 | 3.1 | 9.3 | 40.0 |
| 2 | | 9.3 | 26.3 | 7.8 | 11.2 | 47.2 |
| 3 | | 6.4 | 26.2 | 7.0 | 15.5 | 33.8 |
| 4 | | 4.8 | 22.0 | 5.6 | 9.7 | 43.8 |
| 5 | | 6.4 | 34.6 | 4.4 | 15.0 | 33.9 |
| 6 | | 11.1 | 24.6 | 7.6 | 22.7 | 30.8 |
| 7 | | 7.9 | 22.1 | 3.1 | 15.5 | 46.7 |
| 8 | | 4.8 | 29.8 | 2.4 | 13.2 | 41.3 |
| 9 | | 6.1 | 36.1 | 7.8 | 9.9 | 36.9 |
| 10 | | 7.7 | 31.0 | 7.0 | 15.2 | 36.1 |
| Average | 0.0 | 6.9 | 28.2 | 5.6 | 13.7 | 39.1 |
| Std. Dev | 0.0 | 1.9 | 4.6 | 2.0 | 3.9 | 5.4 |

With face resin alone, 2 minutes press time was too short to bond, whereas 4 minutes was optimized press time. When the panels were pressed for 4 minutes, the IB values of the panels containing PF/synthetic graphite resin were significantly higher than the panels made with PF resin only. This indicates that the curing of the resin was more advanced when the synthetic graphite was added into PF resin.

Table 7, below, shows the density of particle board panels made with face resin and PF+synthetic graphite.

TABLE 7

| | Density (g/cm$^3$) | | | | | |
|---|---|---|---|---|---|---|
| | PF Control Press time (min) | | | PF + Synthetic Graphite Press time (min) | | |
| Samples | 2 | 3 | 4 | 2 | 3 | 4 |
| 1 | | 0.62 | 0.67 | 0.59 | 0.62 | 0.64 |
| 2 | | 0.61 | 0.68 | 0.6 | 0.63 | 0.64 |
| 3 | | 0.6 | 0.61 | 0.6 | 0.59 | 0.64 |
| 4 | | 0.62 | 0.63 | 0.58 | 0.64 | 0.64 |
| 5 | | 0.64 | 0.63 | 0.64 | 0.6 | 0.65 |
| Average | | 0.62 | 0.64 | 0.60 | 0.62 | 0.64 |
| Std. Dev | | 0.01 | 0.03 | 0.02 | 0.02 | 0.00 |

Based on the results shown in Table 7, the synthetic graphite does not affect the board density.

Table 8, below, shows the thickness swelling of particleboard made with face resin and PF+synthetic graphite.

TABLE 8

| | Thickness Swell (%) | | | | | |
|---|---|---|---|---|---|---|
| | PF Control Press time (min) | | | PF + Synthetic Graphite Press time (min) | | |
| Samples | 2 | 3 | 4 | 2 | 3 | 4 |
| 1 | | 46.8 | 43.8 | 53.5 | 34.1 | 23.0 |
| 2 | | 44.9 | 38.2 | 52.3 | 32.0 | 22.5 |
| 3 | | 41.6 | 44.6 | 52.2 | 31.4 | 24.4 |
| 4 | | 49.8 | 37.9 | 52.0 | 26.9 | 24.8 |
| 5 | | 45.0 | 34.8 | 51.0 | 35.9 | 22.9 |
| Average | 0.0 | 45.6 | 39.9 | 52.2 | 32.0 | 23.5 |
| Std. Dev | 0.0 | 2.7 | 3.8 | 0.8 | 3.0 | 0.9 |

Once again, with face resin, the synthetic graphite reduces the thickness swelling of the particleboard.

EXAMPLE 3

According to a preferred embodiment of the invention, Example 3 generally shows synthetic graphite in oriented strand board (OSB) panels.

These experiments were conducted to evaluate the effects of incorporating various concentrations of synthetic graphite in PF resin (face) on the curing rate of the adhesive as well as the bonding properties and dimensional stability of the oriented strand board.

The panels for Example 3 were manufactured using the following conditions:

Commercial flake (aspen from Louisiana Pacific-LP)

Flake Orientation: random

Face resin (liquid PF from Borden-Cascophen OS 707)

Target board density: 40 lbs/ft3 (pcf)

Adhesive content: 4 g solid PF/100 g dry flakes

Synthetic graphite contents: 0, 0.5, 1, 2, and 3% (i.e., g of synthetic graphite/100 g dry flakes)

Board thickness: 7/16"

Press time: 2 minutes cure (when the hot platens touch the mat and the board is 7/16" thick)

Press temperature: 415° F. (temperature of platens).

No emulsion wax was used (typically used now in OSB, a small amount like 1 g or less/100 g dry flakes). Emulsion wax is used to reduce thickness swelling due to water absorption.

Properties tested: internal bond (IB), thickness swelling, flexural modulus of elasticity (MOE) and modulus of rupture (MOR), board density, temperature profile, curing kinetics using DSC (Differential scanning calorimetry).

Table 9, below, shows the effect of synthetic graphite in various concentrations on the MOR, MOE, and density of OSB panels. Based on the results shown in Table 9, the inclusion of synthetic graphite does not degrade the flexural strength/stiffness of the OSB panels. In each of the tables provided below, the term "Thermocarb Content %" is meant to refer to grams of Thermocarb/100 grams of dry flakes.

TABLE 9

| |
|---|
| Table 10 shows the effect of various concentrations of synthetic graphite on the IB of OSB panels. |

TABLE 10

| Sample # | Length (in) | Width (in) | Area (in2) | Max. Load (lbs) | IB (psi) | Note | Thermocarb Content (%) |
|---|---|---|---|---|---|---|---|
| 5A-0-1-B | 1.988 | 1.958 | 3.893 | 49 | 13 | | |
| 5A-0-1-C | 1.989 | 1.946 | 3.871 | 73 | 19 | | |
| 5A-0-2-B | 1.988 | 1.953 | 3.883 | 65 | 17 | | 0 |
| 5A-0-2-C | 1.985 | 1.947 | 3.865 | 31 | 8 | | |
| 5A-0-3-B | 1.987 | 1.947 | 3.869 | 61 | 16 | | |
| 5A-0-3-C | 1.990 | 1.951 | 3.882 | 91 | 23 | | |
| 5A-0-4-B | 1.994 | 1.946 | 3.880 | 84 | 22 | | |
| 5A-0-4-C | 1.991 | 1.949 | 3.880 | 86 | 22 | | |
| | | | | Average: | 17 | | |
| | | | | Std. Dev.: | 5 | | |
| 5A-1/2-1-B | 1.988 | 1.955 | 3.887 | 115 | 30 | | |
| 5A-1/2-1-C | 1.986 | 1.945 | 3.863 | 141 | 37 | | |
| 5A-1/2-2-B | 1.991 | 1.948 | 3.878 | 117 | 30 | | 0.5 |
| 5A-1/2-2-C | 1.988 | 1.952 | 3.881 | 78 | 20 | | |
| 5A-1/2-3-B | 1.992 | 1.947 | 3.878 | 134 | 35 | | |
| 5A-1/2-3-C | 1.992 | 1.951 | 3.886 | 110 | 28 | | |
| 5A-1/2-4-B | 1.995 | 1.948 | 3.886 | 48 | 12 | | |
| 5A-1/2-4-C | 1.990 | 1.951 | 3.882 | 23 | 6 | | |
| | | | | Average: | 25 | | |
| | | | | Std. Dev.: | 11 | | |
| 5A-1-1-B | 1.990 | 1.952 | 3.884 | 78 | 20 | | |
| 5A-1-1-C | 1.992 | 1.945 | 3.874 | 26 | 7 | | |
| 5A-1-2-B | 1.992 | 1.947 | 3.878 | 154 | 40 | | 1 |
| 5A-1-2-C | 1.996 | 1.948 | 3.888 | 117 | 30 | | |
| 5A-1-3-B | 1.992 | 1.947 | 3.878 | 141 | 36 | | |
| 5A-1-3-C | 1.992 | 1.942 | 3.868 | 22 | 6 | | |
| 5A-1-4-B | 1.996 | 1.941 | 3.874 | 151 | 39 | | |
| 5A-1-4-C | 1.989 | 1.946 | 3.871 | 12 | 3 | * | |
| | | | | Average: | 23 | | |
| | | | | Std. Dev.: | 16 | | |
| 5A-2-1-B | 1.955 | 1.993 | 3.896 | | | ** | |
| 5A-2-1-C | 1.989 | 1.947 | 3.873 | 21 | 5 | * | |
| 5A-2-2-B | 1.995 | 1.944 | 3.878 | 47 | 12 | | |
| 5A-2-2-C | 1.992 | 1.945 | 3.874 | 63 | 16 | | 2 |
| 5A-2-3-B | 1.987 | 1.941 | 3.857 | 221 | 57 | | |
| 5A-2-3-C | 1.992 | 1.940 | 3.864 | 218 | 56 | | |
| 5A-2-4-B | 1.991 | 1.946 | 3.874 | 50 | 13 | | |
| 5A-2-4-C | 1.997 | 1.955 | 3.904 | 35 | 9 | | |
| | | | | Average: | 24 | | |
| | | | | Std. Dev.: | 23 | | |
| 5A-3-1-B | 1.992 | 1.944 | 3.872 | 77 | 20 | | |
| 5A-3-1-C | 1.992 | 1.945 | 3.874 | 122 | 31 | | |
| 5A-3-2-B | 1.993 | 1.951 | 3.888 | 159 | 41 | | |
| 5A-3-2-C | 1.992 | 1.954 | 3.892 | 139 | 36 | | 3 |
| 5A-3-3-B | 1.993 | 1.949 | 3.884 | 152 | 39 | | |
| 5A-3-3-C | 1.990 | 1.948 | 3.877 | 73 | 19 | | |

Although the IB results in Table 10 were scattered, it can be seen that the synthetic graphite still has a real heat transfer effect. The optimum concentration of synthetic graphite appears to be below 1%, i.e., 1 g synthetic graphite/100 g dry flakes.

Table 11 shows the effect of synthetic graphite in various concentrations on the dimensional stability of OSB panels.

TABLE 11

| THERMOCARB ® | Thickness Swell (%) | | Water Absorption(%) | |
|---|---|---|---|---|
| Contents (%) | Average | Std. Dev. | Average | Std. Dev. |
| 0 | 40.4 | 4.4 | 78.2 | 7.2 |
| 0.5 | 37.1 | 2.9 | 79.4 | 8.6 |
| 1 | 38.8 | 4.3 | 78.3 | 4.9 |
| 2 | 41.1 | 1.5 | 77.5 | 3.9 |
| 3 | 38.8 | 3.6 | 83.5 | 4.3 |

Unlike in particleboard, the results shown in Table 11 indicate that synthetic graphite did not improve the dimensional stability of OSB panels.

EXAMPLE 4

OSB panels were manufactured as described in Experiment 3. The thickness, however, of the board was increased to 23⁄32", only 1% synthetic graphite was incorporated into the PF adhesive, and the temperature profile during hot pressing was the only property evaluated.

Thermal analysis of pure PF and PF/synthetic graphite resins was also conducted to study the curing kinetics of these resins. Differential scanning calorimetry (DSC) tests were performed using a Mettler Toledo STAR System at a heating rate of 10° C./min. The energy of activation (EA) to start the reaction, n-th order kinetics, maximum peak temperature, and the total thermal energy of reaction or enthalpy of reaction (ΔH) were the kinetic parameters evaluated. The potential for synthetic graphite to enhance the heat conductivity of wood during hot pressing of the board is clearly shown in the following figures, i.e. FIGS. 4A and 4B. It can clearly be seen that the temperature at the core of the panel reached 250° F. after only 225 seconds when synthetic graphite was incorporated into PF resin. Without synthetic graphite, however, it took 270 seconds to reach 250° F. at the center of the panel. Consequently, it appears that synthetic graphite enhances the heat conductivity during hot pressing of wood products.

Figure 4A:
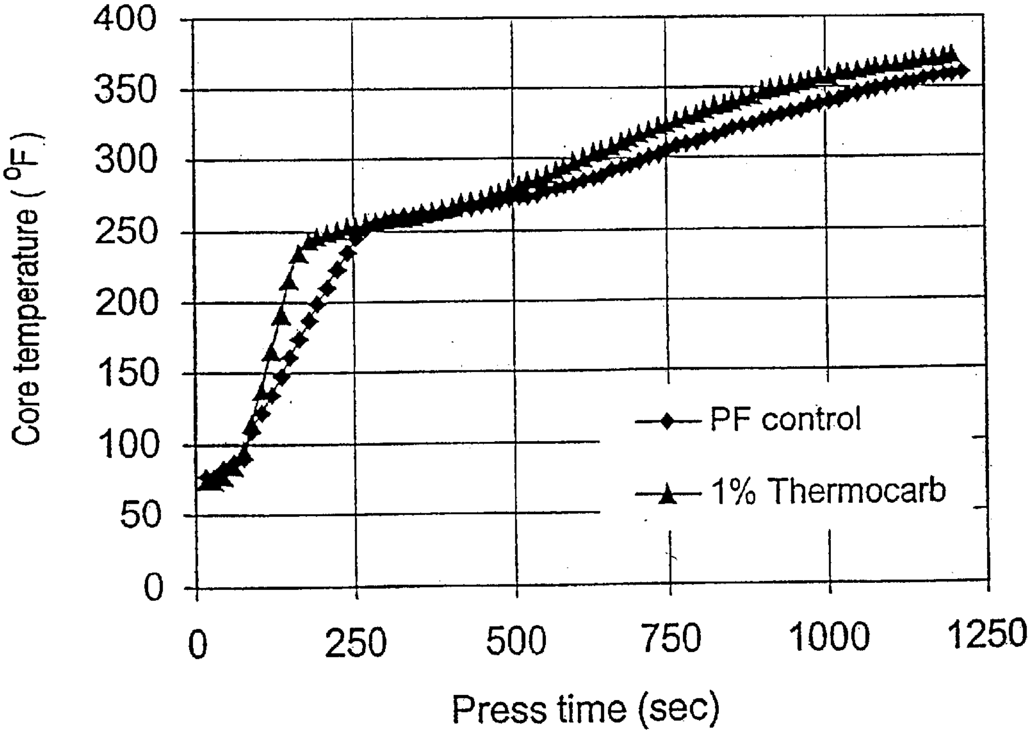
FIG. 4A is a graphic illustration of the temperature profile of the invention.
Figure 4B:
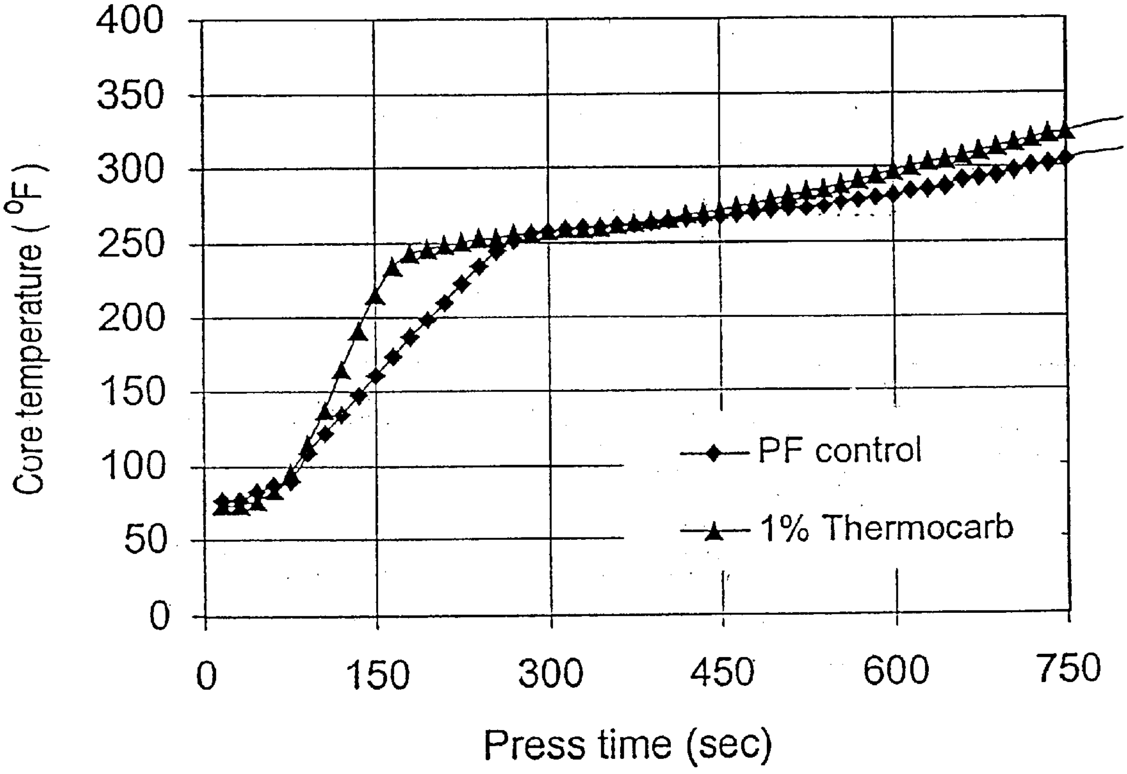
FIG. 4B is a graphic illustration of FIG. 4*a* where the x-axis is shortened.

FIG. 4A shows the temperature profile for OSB panel (23⁄32" thick) pressed at 400° F. (Platen temperature). The curves for pure PF and PF/1% synthetic graphite (1 g synthetic graphite/4 g PF) are illustrated. FIGS. 4A and 4B are the same, except the x-axis is shortened in FIG. 4B so that the heat conductivity enhancement can be observed.

Table 12 shows the curing kinetic parameters of PF (control) and PF/1% synthetic graphite resin.

TABLE 12

| | Curing Kinetic Parameters | | | | |
|---|---|---|---|---|---|
| Samples | EA (kJ/mol) | ΔH (J/g) | Ln (k0) | n-th order | Peak Temp. (° C.) |
| PF control | 128.2 ± 0.9 | 271.7 | 31.9 ± 0.3 | 1.95 | 152.5 |
| PF + THERMOCARB ® (1% THERMOCARB ®) | 127.4 ± 0.7 | 276.5 | 31.7 ± 0.2 | 2.05 | 151.3 |

The results show that the synthetic graphite does not change the kinetics of the PF resin. The synthetic graphite allows a faster cure by getting the heat into wood composite faster due to the high thermal conductivity of the synthetic graphite as compared to the low thermal conductivity (0.2 W/mk of the wood).

EXAMPLE 5

Example 5 entailed adding pitch based carbon fibers to oriented strandboard (OSB). The oriented strand boards were manufactured as described in Example 3 and tested accordingly. Carbon fibers used were 0.5" long, no sizing, with ozone surface treatment.

Table 13, below, shows the effect of various concentrations of carbon fiber contents on the dimensional stability of OSB board. "Carbon fiber contents %" is meant to refer to grams of carbon fiber/100 grams of dry flakes.

TABLE 13

| Carbon Fiber | Thickness Swell (%) | | Water Absorption (%) | |
|---|---|---|---|---|
| Contents (%) | Average | Std. Dev. | Average | Std. Dev. |
| 0 | 36.6 | 3 | 75.3 | 4.3 |
| 0.2 | 39.7 | 4.4 | 76.4 | 6.6 |
| 0.3 | 38.4 | 3.8 | 80.3 | 3.8 |
| 0.4 | 36.1 | 3.5 | 75.8 | 6.6 |
| 0.5 | 36.4 | 2.9 | 74.7 | 4.1 |
| 1 | 42.9 | 4.2 | 81.8 | 4.6 |

Whereas, the present invention has been described in relation to the drawings attached hereto, it should be understood that other and further modifications, apart from those shown or suggested herein, may be made within the spirit and scope of this invention. The examples are provided for illustration purposes only, not for limiting the scope of the invention, which is defined by the written description and the claims below.

We claim:

1. A method of reducing press time in the manufacture of a wood composite, the method comprising:

mixing a thermoset resin, a plurality of wood pieces and a filler to form a mixture, each of the thermoset resin, wood pieces and filler having a thermal conductivity, the thermal conductivity of the filler being greater than the thermal conductivity of the thermoset resin and the thermal conductivity of the wood pieces; and hot pressing the mixture for a sufficient amount of time to form said wood composite board, the amount of time being less than an amount of time required to hot press the same mixture when no filler is used.

2. The method of claim 1, wherein said filler comprises at least one of carbon fiber, metal coated carbon fiber, carbon nanotubes, coke, natural graphite, synthetic graphite, scrap graphite, carbon black, silicon carbide, silicon nitride, boron nitride, metals and mixtures thereof.

3. The method of claim 2, wherein the filler comprises at least one of a natural graphite, synthetic graphite and a combination thereof.

4. The method of claim 1, wherein said thermoset resin comprises at least one of phenolic resin, urea resin, melamine resin, epoxy resin, urethane resin and mixtures thereof.

5. The method of claim 1, wherein said wood pieces are in a form selected from the group consisting of particles, flakes, fibers and mixtures thereof.

6. The method of claim 1, further comprising adding a catalyst to reduce time of curing said thermoset resin at said elevated temperature and said elevated pressure.

7. The method of claim 1, wherein said wood pieces or said wood composite board are acetylated.

8. The method of claim 1, wherein said wood pieces are in the form of fibers; said thermoset resin comprises at least one of a urethane resin, a phenolic resin or mixtures thereof; and said filler comprises at least one of a carbon fiber, metal coated carbon fiber, carbon nanotube, coke, natural graphite, synthetic graphite, scrap graphite, carbon black and mixtures thereof.

9. The method of claim 1, wherein the mixing act further comprises mixing the resin with the wood pieces to form a blend, and then adding a filler to the blend to form the mixture.

10. The method of claim 1, wherein the thermal conductivity of the filler is greater than 0.2 W/mK.

11. The method of claim 1, wherein the wood composite board comprises about 40.0–99.5% by weight wood pieces, about 0.50–50.0% by weight thermoset resin and about 0.05–50% by weight filler.

12. The method of claim 1, wherein the wood composite board comprises at least one of particle board, oriented strand board, waferboard, fiberboard and a combination thereof.

13. A method of manufacturing a wood composite, the method comprising:

mixing a thermoset resin having a thermal conductivity and a plurality of wood pieces having a thermal conductivity to form a blend;

adding a filler having a thermal conductivity to said blend to form a mixture, the filler having a thermal conductivity greater than the thermal conductivity of the resin and the wood pieces;

placing said mixture in a shaped container; and applying elevated temperature and pressure to said mixture in said container to form said wood composite board, the method having a press time that is less than a press time required for the same method when no filler is used.

14. The method of claim 13, wherein said filler comprises at least one of carbon fiber, metal coated carbon fiber, carbon nanotubes, coke, natural graphite, synthetic graphite, scrap graphite, carbon black, silicon carbide, silicon nitride, boron nitride, metals and mixtures thereof.

15. The method of claim 14, wherein the filler comprises at least one of a natural graphite, synthetic graphite and a combination thereof.

16. The method of claim 13, wherein said thermoset resin comprises at least one of phenolic resin, urea resin, melamine resin, epoxy resin, urethane resin and mixtures thereof.

17. The method of claim 13, wherein the wood composite board comprises about 40.0–99.5% by weight wood pieces, about 0.50–50.0% by weight thermoset resin and about 0.05–50% by weight filler.

18. The method of claim 13, wherein said wood pieces are in a form selected from the group consisting of particles, flakes, fibers and mixtures thereof.

19. The method of claim 13, wherein the wood composite board is particle board, oriented strand board, waferboard or fiberboard.

20. A method of manufacturing a wood composite, the method comprising:

mixing a thermoset resin, a plurality of wood pieces and a filler comprising particles having lengths to form a mixture, such that the particles are mixed substantially non-unidirectionally within said resin, each of the thermoset resin, wood pieces and filler having a thermal conductivity, the thermal conductivity of the filler being greater than the thermal conductivity of the thermoset resin and the thermal conductivity of the wood pieces; and hot pressing the mixture for a sufficient amount of time to form said wood composite board.

* * * * *